United States Patent
Hsu

(10) Patent No.: US 7,927,522 B2
(45) Date of Patent: *Apr. 19, 2011

(54) POLARIZED LENS AND METHOD OF MAKING POLARIZED LENS

(76) Inventor: Wen-Yi Hsu, Rancho Cucamonga, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 12/281,379

(22) PCT Filed: Oct. 25, 2007

(86) PCT No.: PCT/US2007/022710
§ 371 (c)(1),
(2), (4) Date: Sep. 2, 2008

(87) PCT Pub. No.: WO2009/054835
PCT Pub. Date: Apr. 30, 2009

(65) Prior Publication Data
US 2010/0012262 A1    Jan. 21, 2010

(51) Int. Cl.
*B29D 11/00* (2006.01)
(52) U.S. Cl. ......... 264/2.7; 264/1.32; 264/1.34; 264/1.7
(58) Field of Classification Search .................. 264/1.32, 264/1.7, 2.7, 1.34
See application file for complete search history.

(56) References Cited

U.S. PATENT DOCUMENTS

| | | | |
|---|---|---|---|
| 2,612,079 A * | 9/1952 | Joseph | 156/229 |
| 4,259,406 A * | 3/1981 | Borrelli | 428/410 |
| 4,432,832 A * | 2/1984 | Fantone | 216/24 |
| 4,657,354 A * | 4/1987 | Kobayashi | 359/718 |
| 4,923,758 A | 5/1990 | Marks et al. | |
| 4,992,218 A | 2/1991 | Sugio et al. | |
| 5,751,481 A | 5/1998 | Dalzell et al. | |
| 5,856,860 A | 1/1999 | Bhalakia et al. | |
| 7,036,932 B2 | 5/2006 | Boulineau et al. | |
| 7,128,415 B2 | 10/2006 | Chou | |
| 7,350,917 B2 | 4/2008 | Kawai et al. | |
| 2001/0035935 A1* | 11/2001 | Bhalakia et al. | 351/159 |
| 2004/0212885 A1* | 10/2004 | Mizushima et al. | 359/497 |
| 2005/0243274 A1* | 11/2005 | Chou | 351/177 |
| 2007/0045596 A1* | 3/2007 | King et al. | 252/582 |
| 2007/0241313 A1 | 10/2007 | Kato | |

* cited by examiner

*Primary Examiner* — Joseph S Del Sole
*Assistant Examiner* — Ninh V Le
(74) *Attorney, Agent, or Firm* — Alexander Chen, Esq.

(57) ABSTRACT

An eyeglass lens is made of layers which include an outer, convex hard coating, a layer of hard epoxy, a PVA film, a layer of soft epoxy, a layer of adhesive, a base material, and an inner, concave hard coating. The major steps in producing the lens are to 1: prepare a clean, soft PVA film; 2: form the PVA film into the desired curved shape using a convex mold; 3: add hard epoxy to the outer, convex side of the PVA film; 4: add soft epoxy to the inner, concave side; 5: add the base material to the inner, concave side; and 6: harden and package the lens.

14 Claims, 6 Drawing Sheets

POLARIZED LENS AND METHOD OF MAKING POLARIZED LENS

CROSS-REFERENCE TO RELATED APPLICATIONS

This application claims the benefit of the filing date of PCT patent application Ser. No. PCT/US07/22710, filed on Oct. 25, 2007, the disclosures of which are incorporated herein by reference.

FIELD OF THE INVENTION

This invention is generally related to eyewear, and more particularly to polarized lenses for glasses and a method of making polarized lenses.

BACKGROUND OF THE INVENTION

Polarized lenses have been made using wafers of flat, laminated layers including polarized films, such as polyvinyl alcohol (PVA), laminated with polymers, such as CR-39 or polyurethane, which are subjected to heat and pressure and then bent into the desired lens curvature. Such wafers are not strong, and the heating and bending of the polarized film with its composite sheets in a mold or casting could result in splitting, cracking, or optical deformation. Injection molding at lower temperatures could damage the surface of the polymer, while use of high temperatures could damage the surface of the polarized film. It could be difficult to obtain the desired radius of curvature without damaging the already laminated wafer.

Such lenses did not take advantage of the polarizing qualities of polyvinyl alcohol (PVA) combined with the use of quantities of epoxy which can include photochromic agents. Such lenses also did not allow for the polymer base material and the polarized film to be separately dipped for coloring. Such lenses were not always suitable for reading glasses, goggles, prescription RX lens, or sunglasses with polarized photochromic, colored, or gradient lenses.

It is therefore an object of the invention to provide a method of making polarized lenses, which avoids the problems associated with current method of preparing lenses, and to provide a lens made by said method.

SUMMARY OF THE INVENTION

An eyeglass lens is made of layers which include an outer, convex hard coating, a layer of hard epoxy, a PVA film, a layer of soft epoxy, a layer of adhesive, a base material, and an inner, concave hard coating. The major steps in producing the lens are to 1: prepare a clean, soft PVA film; 2: form the PVA film into the desired curved shape using a convex mold; 3: add hard epoxy to the outer, convex side of the PVA film; 4: add soft epoxy to the inner, concave side; 5: add the base material to the inner, concave side; and 6: harden and package the lens.

BRIEF DESCRIPTION OF THE DRAWINGS

The invention is generally shown by way of reference to the accompanying drawings in which.

DETAILED DESCRIPTION OF THE INVENTION

Some embodiments are described in detail with reference to the related drawings. Additional embodiments, features and/or advantages will become apparent from the ensuing description or may be learned by practicing the invention. In the figures, which are not drawn to scale, like numerals refer to like features throughout the description. The following description is not to be taken in a limiting sense, but is made merely for the purpose of describing the general principles of the invention. The steps described herein for performing methods form one embodiment of the invention, and, unless otherwise indicated, not all of the steps must necessarily be performed to practice the invention, nor must the steps necessarily be performed in the order listed.

Figure 1:
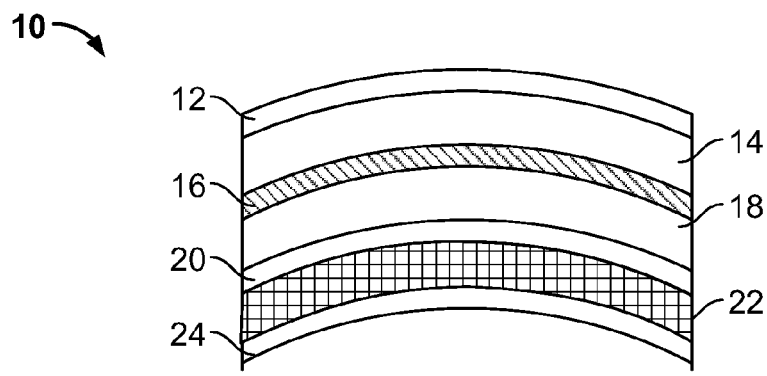
FIG. 1 depicts one embodiment of a lens having layers.

The present invention is a polarized lens and a method of making polarized lenses. As depicted in FIG. 1, one embodiment of lens 10 will have layers as follows: outer, convex hard coating 12; layer of hard epoxy 14; PVA film 16; layer of soft epoxy 18; layer of adhesive 20; base material 22; and inner, concave hard coating 24. A "convex" surface generally bulges out like the outside of a ball, and a "concave" surface generally curves in like the inside of a bowl. The lens user or eyeglass wearer generally peers into the concave side, so the concave side of lens 10 is "inner" and the convex side is "outer." In another embodiment, layer of adhesive 20 and base material 22 are above PVA film 16, rather than below it as depicted in FIG. 1, resulting in a lens 10 where base material 22 is closer to the outer side than the inner side.

PVA 16 is polarized polyvinyl alcohol and may also be tinted or combined with a photochromic agent, which is a chemical that causes a reversible change in color or darkness on exposure to light. Adhesive 20 could be made of a mixture of acrylic resin, polyurethane and oil based solvent. Base material 22 could be polycarbonate, polyurethane, polyethylene, nylon, allyl diglycol carbonate monomer (CR-39), Polymethyl-methacrylate (PMMA), glass, or other material, and can be injection molded or otherwise cast with or without pressure to have a desired curvature and optical qualities. Base material 22 could be pre-formed with hard coatings on one or both sides. Outer, convex hard coating 12 and inner, concave hard coating 24 can be resin materials that provide scratch resistance, UV protection, anti-reflective coatings, mirrored coatings, multi-layer coatings, water-resistance, decorative designs, or a combination of these features. The coatings on the lens or base material can be applied by deposition or vacuum coating, and can include a mirrored coating on the outer, convex side, or an anti-reflective coating on the inner, concave side.

Hard epoxy 14 is "hard" because it is near the outer surface of the lens where scratch resistance is desirable, and soft epoxy 18 is "soft" because it acts as a buffering gel between PVA 16 and base material 22 to help prevent cracking. Both can be any epoxy or epoxy mixture, and can consist of more than half epoxy resin combined with one or more of polyurethane, acrylic resin, CR-39, or silicon. Both can also be mixed with coloring, tinting, photochromic agents, infrared or ultraviolet blockers, stabilizers, stiffeners, anti-oxidants, anti-fog treatments, or silicon hard coatings. In one embodiment, hard epoxy 14 has a pencil softness rating of 1 B to 3 B, and soft epoxy 18 has a pencil softness rating of 2 B to 4 B.

The major steps in producing the lens are described in the following sections.

1. Prepare a Clean, Soft PVA Film

Figure 2:
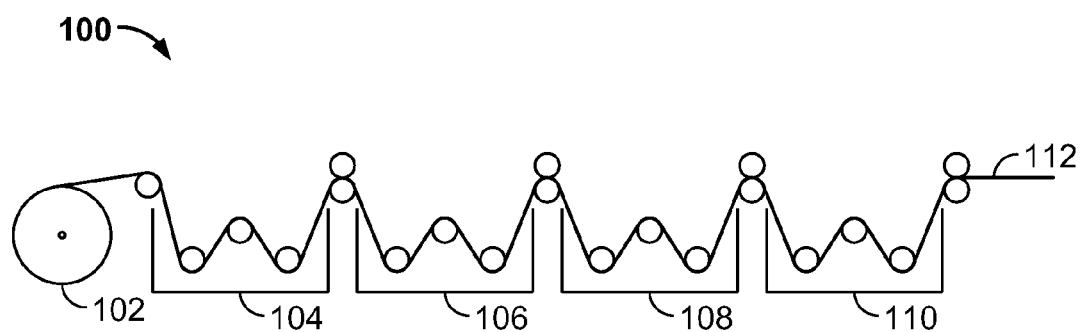
FIG. 2 depicts one embodiment of an assembly line to prepare a clean, soft PVA film.

FIG. 2 depicts one embodiment of an assembly line to prepare a clean, soft PVA film. Start with an untreated roll of PVA film 102, which is about 0.075 mm thick and generally without sufficient sunlight glare protection or directional molecular arrangement (generally not polarized). Process using assembly line 100 which has rollers to transport PVA film 102 through one or more stages as follows:

mount untreated roll of PVA film 102 at the beginning of assembly line 100;

use water to wet, clean, and wash the film until it has approximately 70%-85% water saturation in stage 104;

soften, expand and stretch the film in stage 106;

dye dip the film to add tinting, color, or photochromic agents, and further stretch the film in stage 108; and clean the film again in stage 110.

PVA film 102 is stretched to about 4 to 6 times its original length, its width is reduced to about one half its original width, and its thickness is reduced to about one third of the original thickness, namely, about 0.02 mm to 0.03 mm. The molecules of PVA film 102 will become more evenly aligned and will become substantially polarized, which reduces glare. Darker lenses, such as those which transmit only 13% to 18% of the light, should filter out approximately 95% to 99% of unpolarized light. Lighter lenses, such as yellow lenses, would filter less than 95%. PVA film 102 is placed in water until it contains about 70%-85% water, which will make it soft and elastiC. PVA film 102 can be dipped to produce either a uniform coating or a gradient effect using photochromic agents or coloring chemicals such as dichroic dyes or iodine. This produces a clean, polarized PVA film 112 which is soft due to its high water saturation, which can be fed into a second assembly line for further processing.

2. Form the PVA Film into the Desired Curved Shape Using a Convex Mold

Figure 3A:
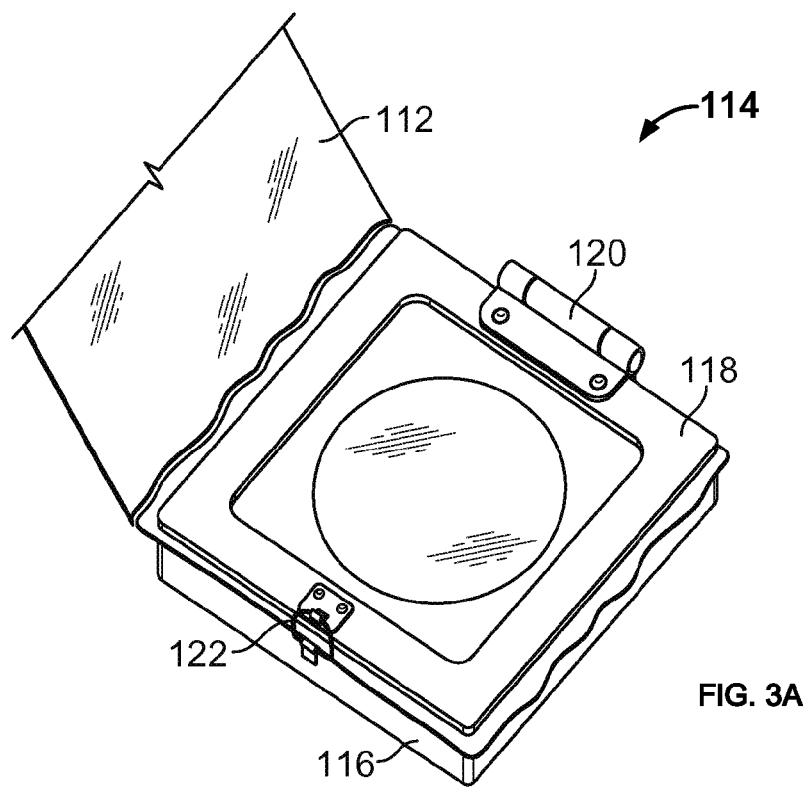
FIGS. 3A and 3B depict one embodiment of a holding frame.
Figure 3B:
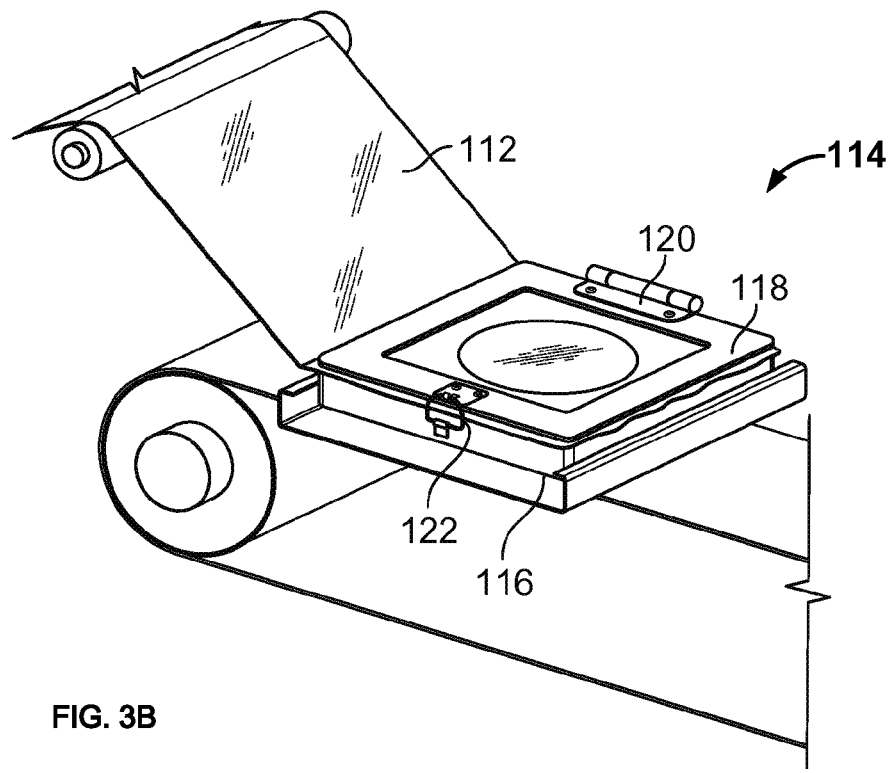

FIGS. 3A and 3B depict one embodiment of a holding frame 114. PVA film 122 is stabilized between lower frame plate 116 and upper frame plate 118, which are held together with frame hinge 120 and clip 122. Additional clips can be used to help prevent PVA film 112 from shrinking during shaping.

Figure 4A:
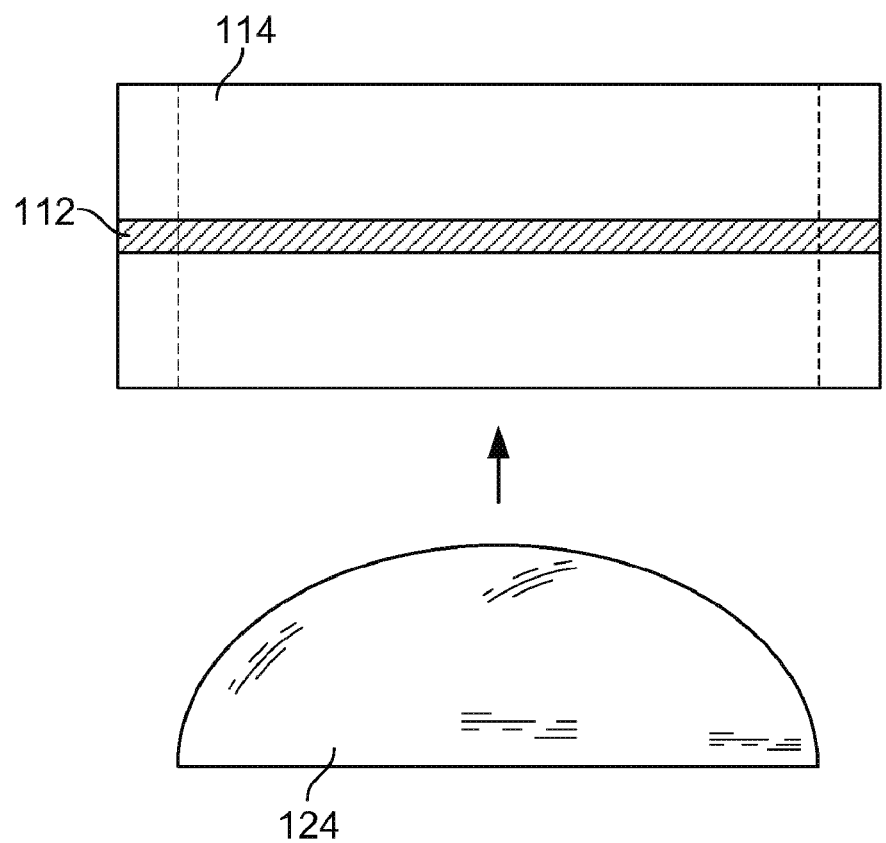
FIGS. 4A and 4B depict one embodiment of the PVA film being formed into the desired curved shape using one side of a convex mold.
Figure 4B:
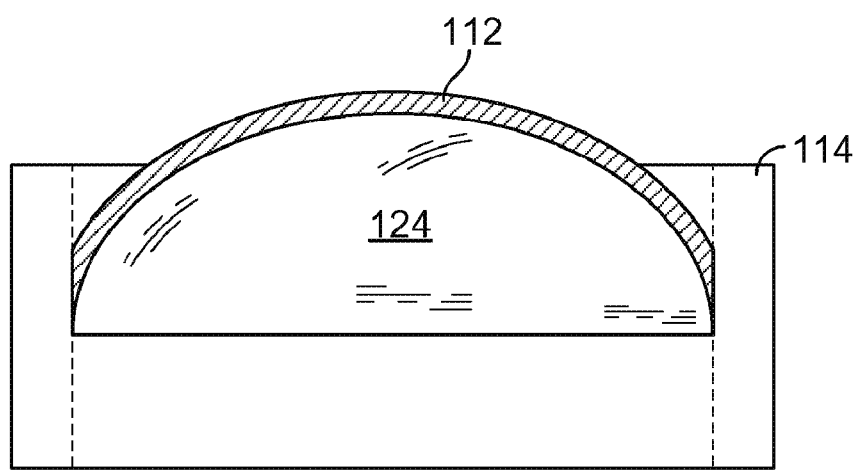

FIGS. 4A and 4B depict one embodiment of the PVA film being formed into the desired curved shape using one side of a convex mold as follows:

stabilize and cut PVA film 112 on holding frame 114;

press convex mold 124 onto PVA film 112 to force the film into the desired curved shape;

heat PVA film 112 at 60° C. to 80° C. until its moisture content is about 50%;

inspect and mark the polarization direction of PVA film 112; and dry the PVA film 112 at approximately 25° C. and 40-50% humidity until its moisture content is about 40%.

PVA film 112 is cut from the end of the clean, soft PVA film output from assembly line 100 into the approximate final lens size or larger. Holding frame 114 is open in the center, which allows convex mold 124 to be pushed through holding frame 114 and against PVA film 112. FIG. 3B shows that holding frame 114 can be held on a conveyor belt which is used in the second assembly line.

One side of convex mold 124 is used to shape PVA film 112. The convex surface of convex mold 124 is pushed into the flat piece of soft film to bend it into the desired shape, curve or arC. Since PVA film 112 is soft and wet, it will conform its shape to the mold. In one embodiment, convex mold 124 is made of glass, such as glass in common practice for forming thermoset resin ophthalmic lenses, or another material that is relatively transparent or ultraviolet light, so that the epoxy can be cured by UV light which passes through the mold. In other embodiments, convex mold 124 is made of a material which conducts heat, so that heat can pass through the mold.

PVA film 112 is heated at about 80° C. or less to remove the moisture from the wet PVA without melting it. This should take about 10 minutes. PVA film 112 was "wet" because its moisture content made it relatively soft, and it becomes "dry" because the reduction in moisture content will fix or lock in its shape. Temperatures above 80° C. may act to melt or liquefy the film.

PVA film 112 is inspected in a quality control stage after the initial drying for air bubbles, dirt, color evenness, polarization levels, tears, etc. The diopter and other optical properties of PVA film 112 can be measured. If all is approved, the lens is marked with a polarization direction marker. After marking, PVA film 112 can then be removed to a clean room at room temperature and low humidity levels for further cooling until PVA film 112 contains about 40% water, which is a good moisture content to adhere with epoxy or other materials. Dryer conditions below 30% can cause cracking. This produces a curved, dry PVA film 112, which eventually becomes PVA film 16 layer in final lens 10.

3. Add Hard Epoxy to the Outer, Convex Side of the PVA Film

Figure 5A:
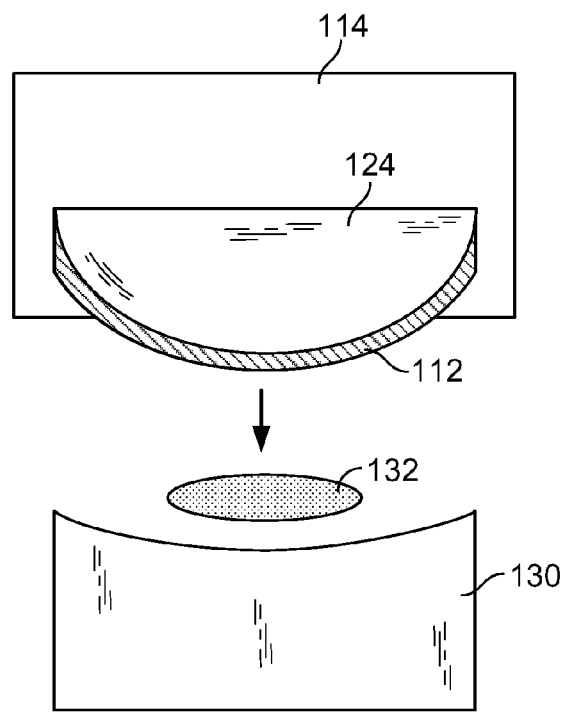
FIGS. 5A and 5B depict one embodiment of a thin, outer layer of epoxy being added to the PVA film.
Figure 5B:
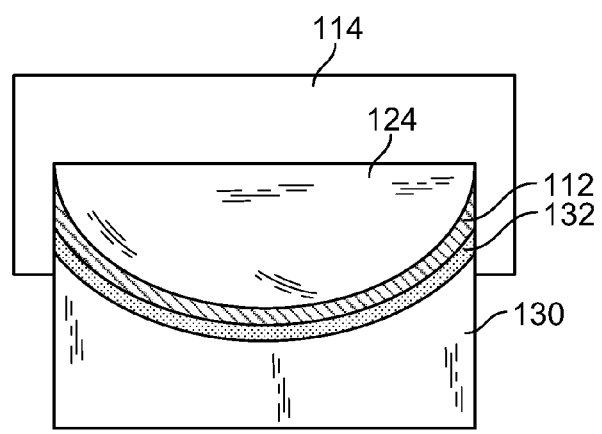

FIGS. 5A and 5B depict one embodiment of a thin, outer layer of epoxy being added to the PVA film as follows:

polish and clean the surface of concave mold 130;

add about 5 cc of hard epoxy 132 in liquid form onto concave mold 130; and position concave mold 130 and convex mold 124 together so that the outer surface of PVA film 122 is pressed down onto hard epoxy 132;

compress molds 124 and 130 together;

determine direction of polarization; and

UV hardening.

Like convex mold 124, concave mold 130 can be made of transparent glass. About 5 cc of hard epoxy 132 is used, which should spread out to form a layer about 0.1 mm-0.5 mm thick, preferably 0.2 mm-0.3 mm for good surface tension. This eventually becomes layer of hard epoxy 14 in lens 10. Thermosetting epoxies should be heated to about 80° C. to 90° C. so that they will be liquid or semi-liquid, to help eliminate bubbles, and so that coloring, photochromic agents, UV and infrared-blocking powders can be added. The liquid epoxy is soft enough to flow, but it is not so viscous that it will flow away without adhering. The liquid epoxy can be dripped onto PVA film 112, smoothly expanding from the center in a circular motion to evenly spread the epoxy and help remove air bubbles. This process can be performed in an environment at approximately room temperature.

In one embodiment, holding frame 114 still holds PVA film 112 in contact with convex mold 124, and the convex mold-plus-PVA film combination is inverted and placed on top of concave mold 130 and attached together with a mold-holding tool (not shown). Because the final layer of hard epoxy 132 is less than 0.5 mm, no gasket is needed. During UV hardening, the liquid epoxy is cured and made hard using ultraviolet light, heat, radiation, pressure, passage of time, or other methods for hardening epoxy.

Figure 6:
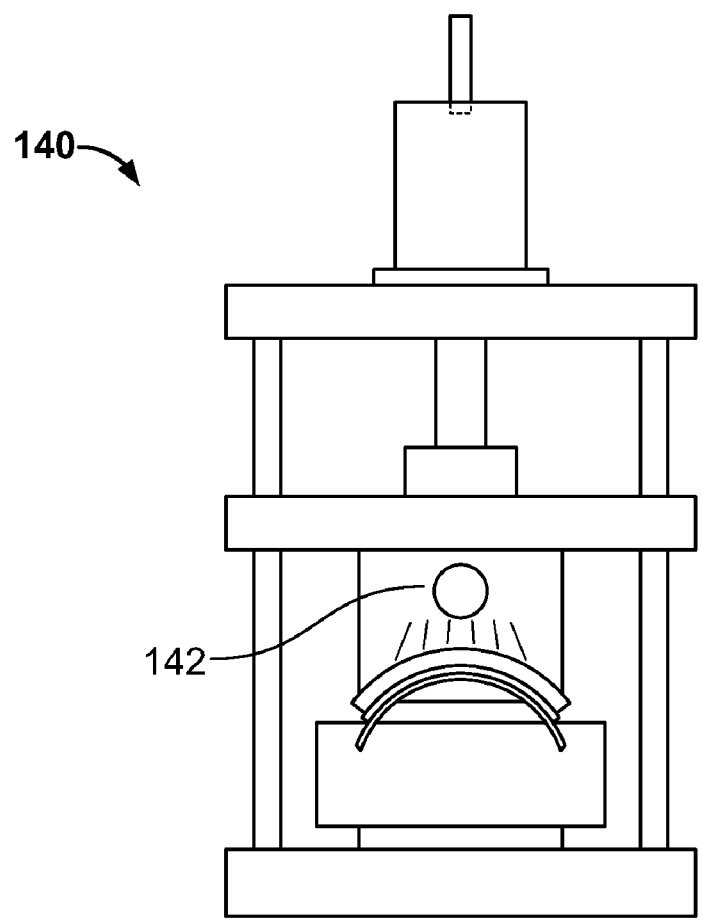
FIG. 6 depicts an embodiment of a compressor with UV hardening equipment.

FIG. 6 depicts an embodiment of a compressor 140, which could be an adjustable compressing machine. The PVA-plus-epoxy collection of holding frame 114, convex mold 124, PVA film 112, hard epoxy 132 and concave mold 130 are placed in compressor 140. The convex side of PVA 112 film is pressed down against the epoxy-lined surface of concave mold 130 to help remove air bubbles and evenly spread out the layer of hard epoxy 132. The pressure is applied by compressor 140 to adjust the thickness of hard epoxy 132 to the desired thickness, which is about 0.1 mm to 0.2 mm. The polarization is also be adjusted. In one embodiment, in addition to pressing, compressor 140 also performs preliminary UV hardening using UV light source 142. In other embodiments, compressor 140 includes heating equipment or other equipment for curing epoxy or allowing epoxy to harden.

The PVA-plus-epoxy collection is then sent to an assembly line with UV hardening equipment to be hardened for about three minutes. Fine shaping can also be performed manually at this stage by cutting away excess PVA. This produces a PVA film 112 with a hard layer of epoxy 132 on its outer, convex surface.

In another embodiment, this produces a polarized wafer coated with epoxy on one side. The uncoated concave side, the epoxy-lined convex side, or both sides could then be combined with a base material, through casting in a gasket mold, injection molding, or other methods for combining lens components.

4. Add Soft Epoxy to the Inner, Concave Side

Figure 7:
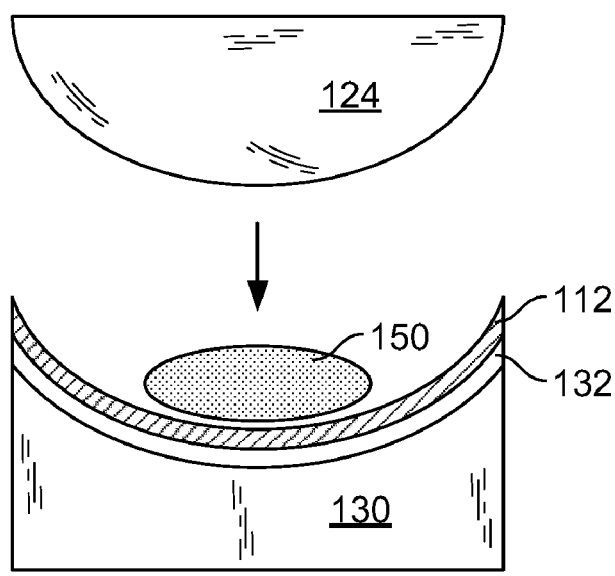
FIG. 7 depicts one embodiment of soft epoxy being added to form a buffer gel layer on the inner, concave surface.

FIG. 7 depicts one embodiment of soft epoxy being added to form a buffer gel layer on the inner, concave surface as follows:

remove holding frame 114 and cut away the excess PVA film 122;
    remove convex mold 124;
    inject about 5 cc of soft epoxy 150 in liquid form onto the exposed, concave side of PVA film 112;
    place convex mold 124 back on top so that the concave surface presses against soft epoxy 150;
    compress molds 124 and 130 together;
    UV hardening; and
    remove convex mold 124 again.

Excess PVA can be cut away manually, using a lens-cutting machine, or with a computer numerical control (CNC) cutting machine, to form a variety of lens shapes. Compressor 140 is used again, and can also perform preliminary UV or other hardening of soft epoxy 150. This results in a shaped PVA film 112 with epoxy on both sides. Soft epoxy 150 eventually becomes layer of soft epoxy 18 in lens 10. Instead of re-using convex mold 124, a third mold or another properly shaped component could be used to press against soft epoxy 150.

In another embodiment, this produces a polarized wafer coated with epoxy on both sides. One or both sides of the polarized wafer could then be combined with a base material, through casting in a gasket mold, injection molding, or other methods for combining lens components.

5. Add the Base Material to the Inner, Concave Side

Figure 8:
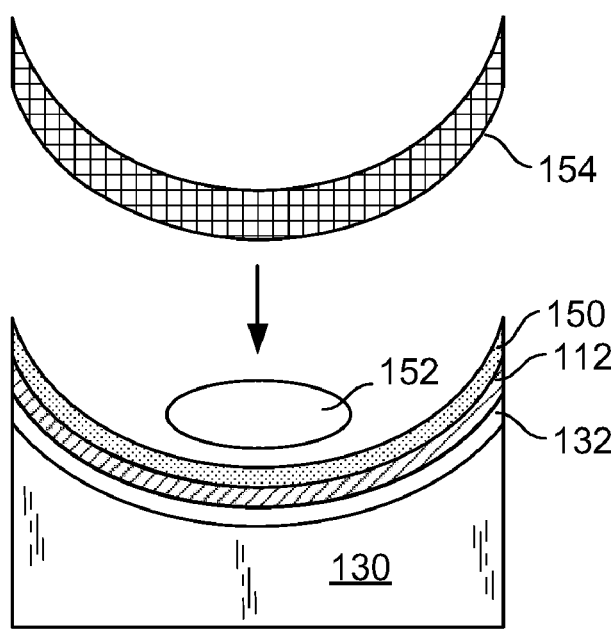
FIG. 8 depicts the base material of the lens being glued to the inner, concave surface.

FIG. 8 depicts the base material of the lens being glued to the inner, concave surface as follows:

add about 2 cc of adhesive 152 onto the exposed, concave surface of soft epoxy 150;
    combine with base material 154;
    compress mold 130 against base material 154; and
    inspect.

Compressor 140 is used again, and can also perform preliminary UV or other hardening of adhesive 152. Base material 154 can have coatings on either side, which can include hard coatings, multi-layer coatings, water resistance, reflector coatings or mirrored coatings, either uniform or in patterns or gradients. Adhesive 152 and base material 154 will eventually become layer of adhesive 20 and base material 22 of lens 10. The combined lens is inspected to check for optical functionality, dirt, adhesion conditions, etc. If it passes inspection, it is sent to the next step; otherwise, the rejected lens is processed accordingly.

6. Harden and Package the Lens

The outer layers of the lens are hardened as follows:
    sonic cleaning;
    heat dry;
    enter a clean laboratory;
    perform single-sided lens hardening;
    check for defects, remove any remains and excess PVA, clean, and inspect again;
    perform single-sided lens hardening on the other side; and
    package the finished lens.

The hardening applied to the convex surface will become convex hard coating 12 of lens 10, and the hardening applied to the concave surface will be come concave hard coating 24. This produces a finished lens 10. In one embodiment, a lens-cutting machine or a CNC machine is used to form a variety of lens shapes. In another embodiment, two lenses 10 are mounted in a frame to form polarized eyeglasses or spectacles. In yet other embodiments, lens 10 is mounted or combined with other lenses to provide wrap-around spectacles or masks, single-lens glasses, rimless eyeglasses, magnifying glasses, telescopes, binoculars, or other polarized optical components.

Although the present invention has been described by way of example with references to the drawings, it is to be noted herein that various changes and modifications, including performing steps in different orders, will be apparent to those skilled in the art. Therefore, unless such changes and modifications depart from the scope of the present invention, they should be construed as being included therein.

What is claimed is:

1. A method of making a polarized lens comprising the steps of:
progressively wetting, stretching, dyeing, and cleaning a polyvinyl alcohol (PVA) film by an assembly line having rollers so as to let molecules of the PVA film have a parallel linear direction; providing a holder having a lower frame and an upper frame coupled by a hinge; clipping the PVA film by having the upper frame closed onto the lower frame wherein a first surface of the PVA film faces the lower frame and a second surface of the PVA film faces the upper frame, so that both of the upper frame and the lower frame with two opposite plates clip the PVA film along a direction perpendicular to the parallel direction of molecules in order to prevent the PVA film itself from shrinking; pressing a convex mold against the first surface of the PVA film through an opening of the lower frame of the holder, thereby substantially conforming the PVA film to the convex mold, and the first surface becoming a concave surface and a second surface opposite the first surface becoming a convex surface; drying the PVA film.

2. The method of claim 1 further comprising the steps of:
applying a quantity of first epoxy on a center of an upper surface of a concave mold;
up-side down pressing the convex mold having the second surface of the PVA against the first epoxy so as to form a laminated first epoxy film by spreading the first epoxy in a circular motion and help remove air bubbles;

hardening the laminated first epoxy film;

removing the convex mold to expose the first surface removing the holder;

applying a quantity of second epoxy on a center of the first surface;

pressing the convex mold against the first surface of the PVA film so as to form a laminated second epoxy film; and hardening the laminated second epoxy film.

3. The method of claim 1, wherein the step of progressively wetting, stretching, dyeing, and cleaning a PVA film, comprising the steps of providing a roll of PVA film;

providing an assembly line having rollers;

mounting the roll of PVA film at the beginning of the assembly line;

using water to wet the PVA film at a first stage of the assembly line until it has moisture content between 70% and 85%;

stretching the PVA film at a second stage of the assembly line;

and dye-dipping the PVA film at a third stage of the assembly line until the PVA film substantially polarized.

4. The method of claim 3, wherein each stage having at least one bath and each bath having rollers placed at a lower position closed to the bottom and rollers placed at a higher position and from a bath to another also having rollers placed atop sidewalls between two adjacent baths so that the PVA film can be stretched continuously.

5. The method of claim 1, after the step of clipping the PVA film with a first surface thereof downward in the holder and before the steps of pressing a convex mold against the first surface of the PVA film further comprises the steps of:

stabilizing the PVA film;

and cutting the PVA film.

6. The method of claim 1, wherein the step of progressively wetting, stretching, dyeing, and cleaning a PVA film by an assembly line further comprises:

dipping the PVA film to add gradient tinting.

7. The method of claim 1, wherein the step of drying the PVA film further comprises:

substantially reducing moisture content of the PVA film so that the PVA film will become stiff enough to generally retain its shape.

8. The method of claim 2, wherein the first epoxy film in the polarized lens has a pencil softness rating of from approximately B to 3 B.

9. The method of claim 2, wherein the first epoxy comprises more than half epoxy resin combined with one or more polyurethane, acrylic resin, CR-39, or silicon.

10. The method of claim 2, wherein the first epoxy for performing the step of applying a quantity of first epoxy on a center of an upper surface of a concave mold is at liquid or semi-liquid state.

11. The method of claim 2, wherein the step of up-side down pressing the convex mold having the second surface of the PVA against the first epoxy is performed using a pressing machine so that the first epoxy presses against the concave mold and the first epoxy out to a generally consistent thickness.

12. The method of claim 11, wherein the pressing machine includes a UV light source and performs at least partial UV curing of the first epoxy film.

13. The method of claim 2 further comprising:

combining the polarized lens with a base material.

14. The method of claim 13, wherein the base material comprises:

at least one material selected from the group of polycarbonate, polyurethane, polyethylene, nylon, CR-39, and PMMA.

* * * * *